Oct. 23, 1962 L. R. ISERMAN ET AL 3,059,716
ONE-MAN OPERATION REMOTE CONTROL MECHANISM
FOR MOTOR VEHICLES
Filed May 4, 1959 5 Sheets-Sheet 1
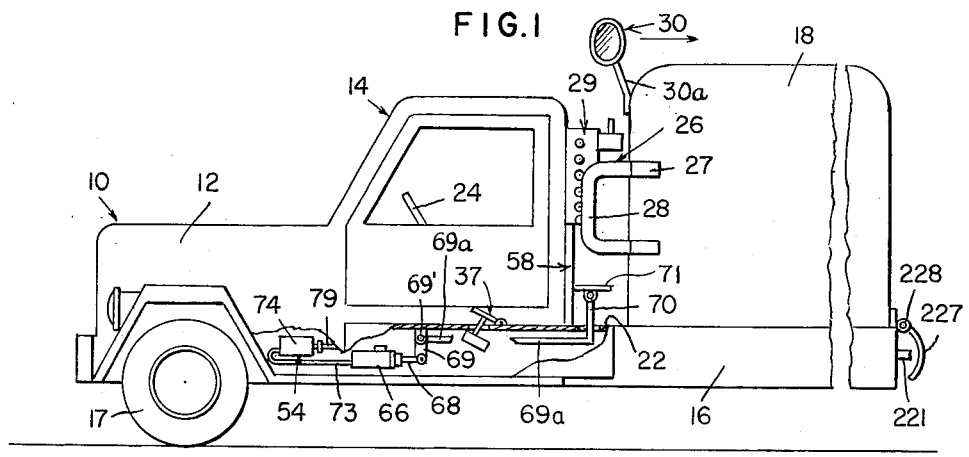
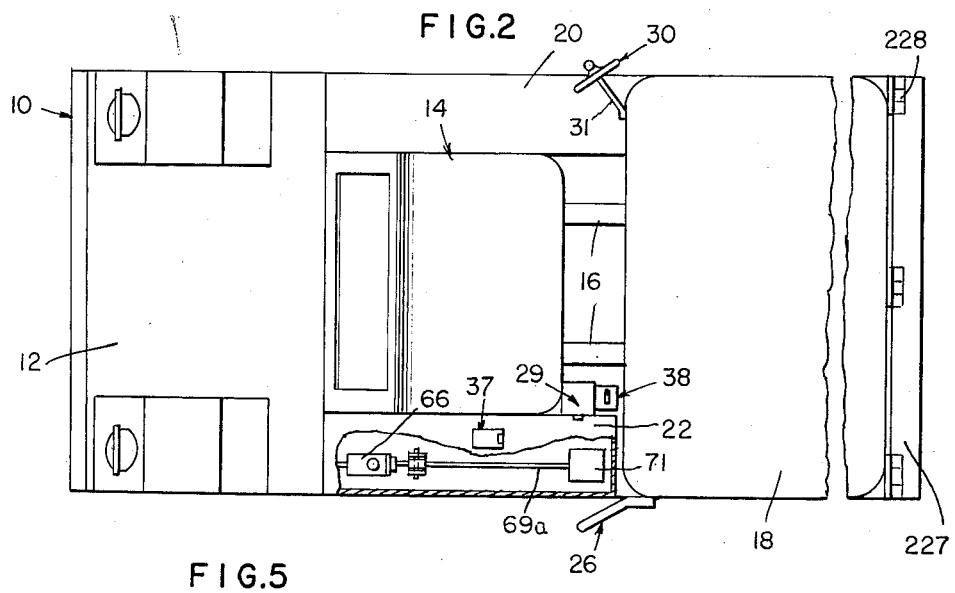
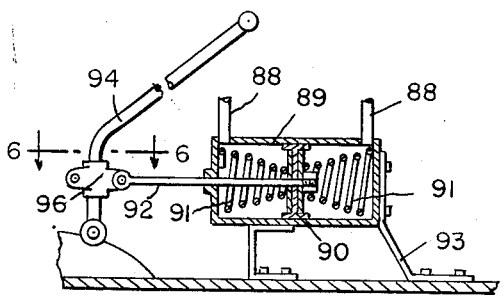
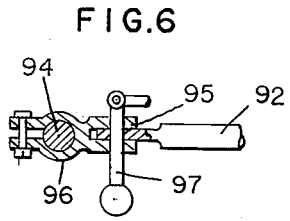
INVENTORS
Lavern R. Iserman
BY Robert E. Stuck
Shoemaker & Mattare
ATTYS.

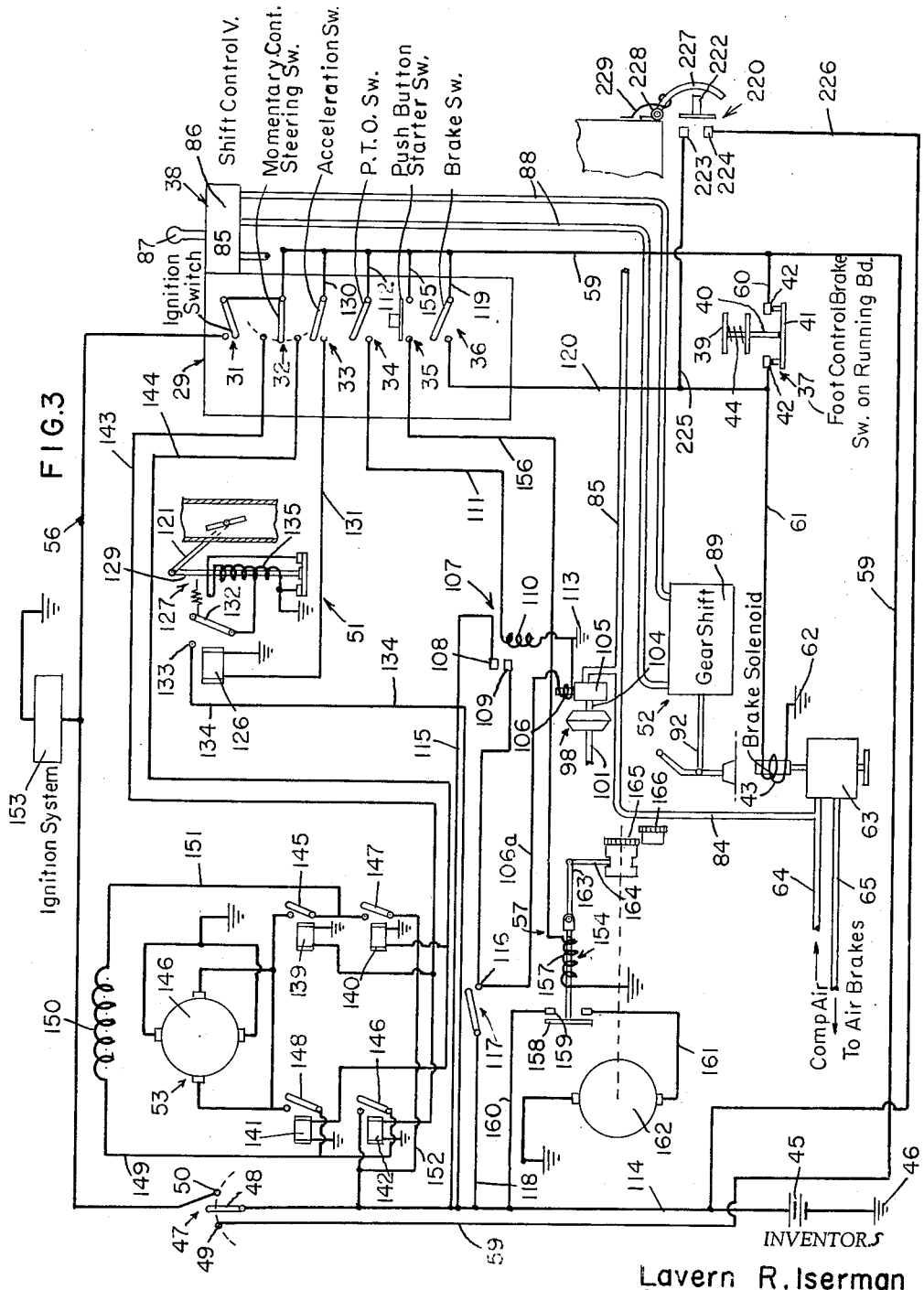

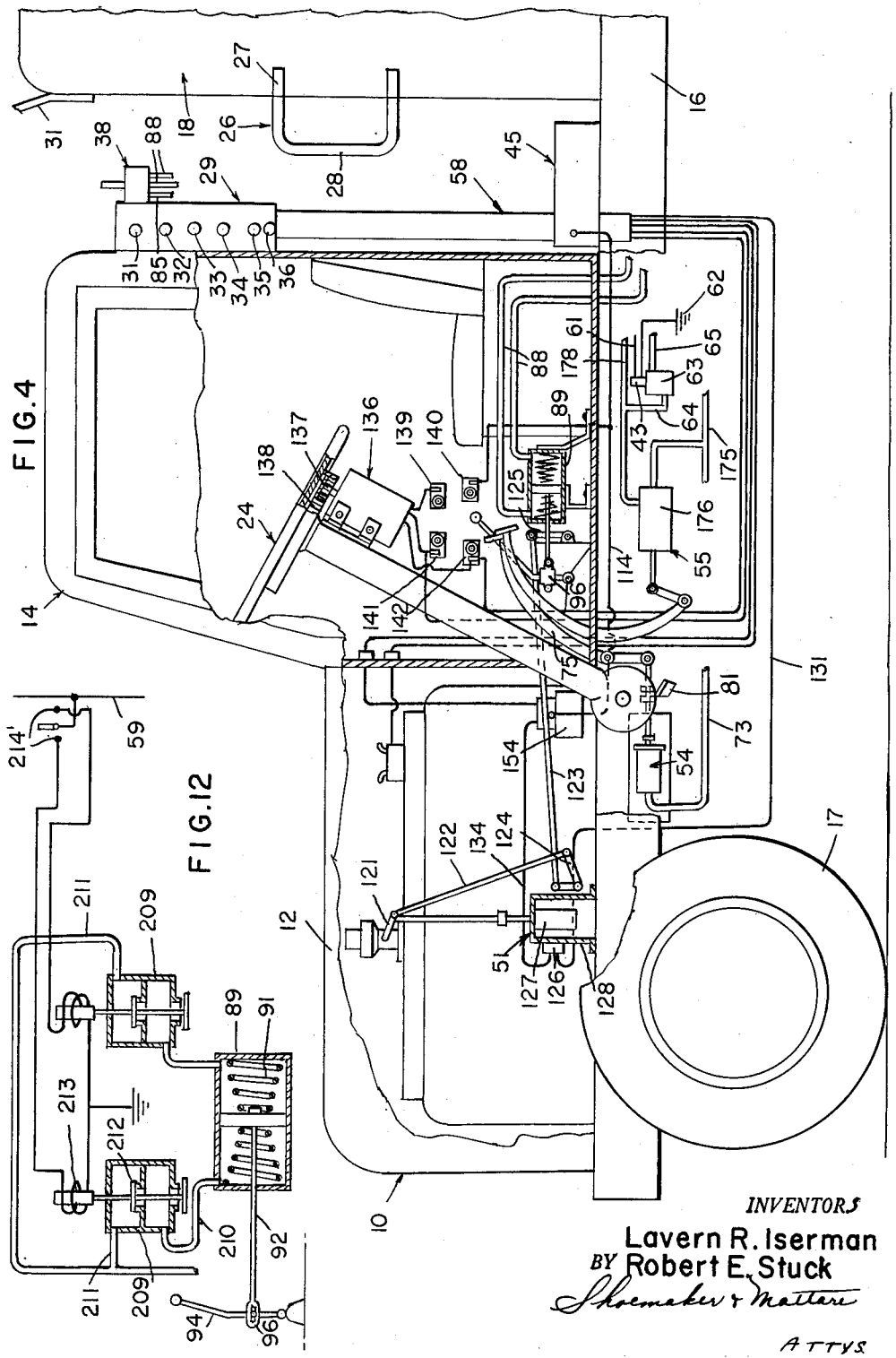

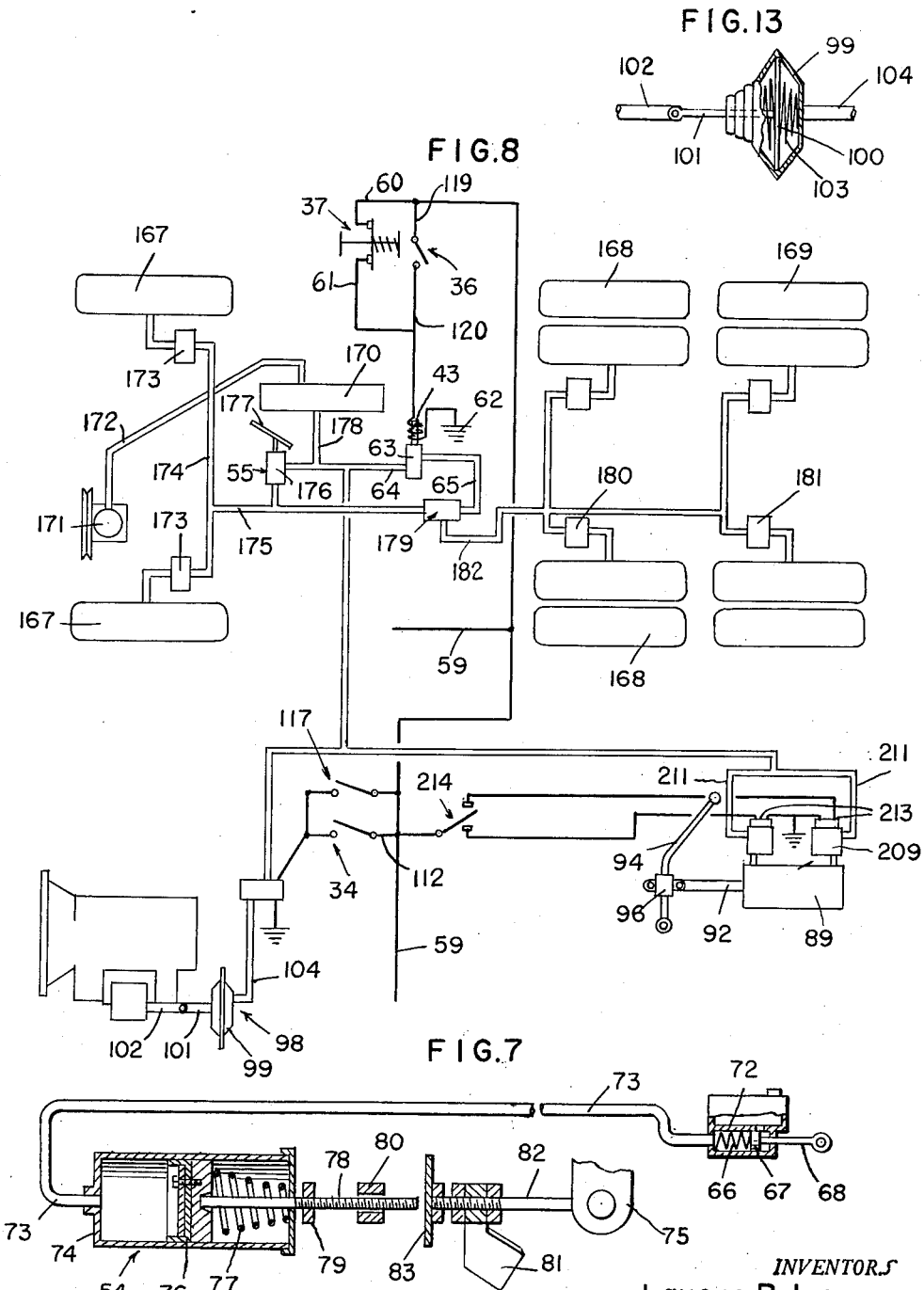

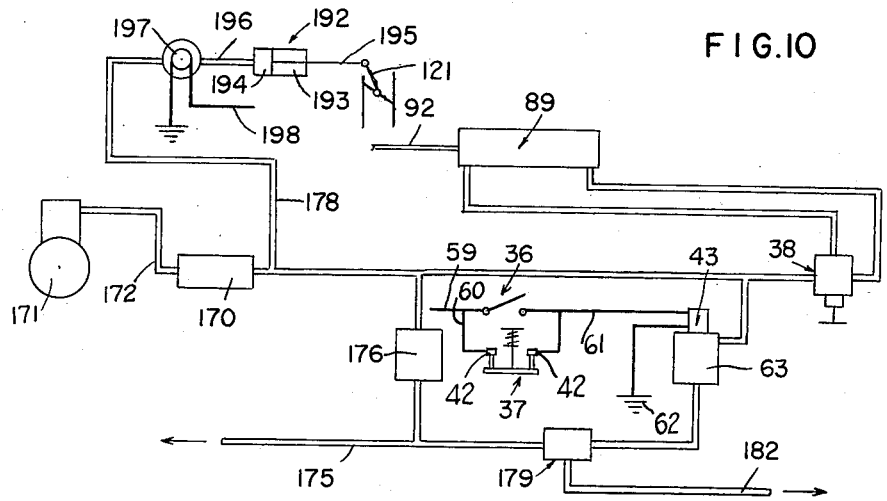
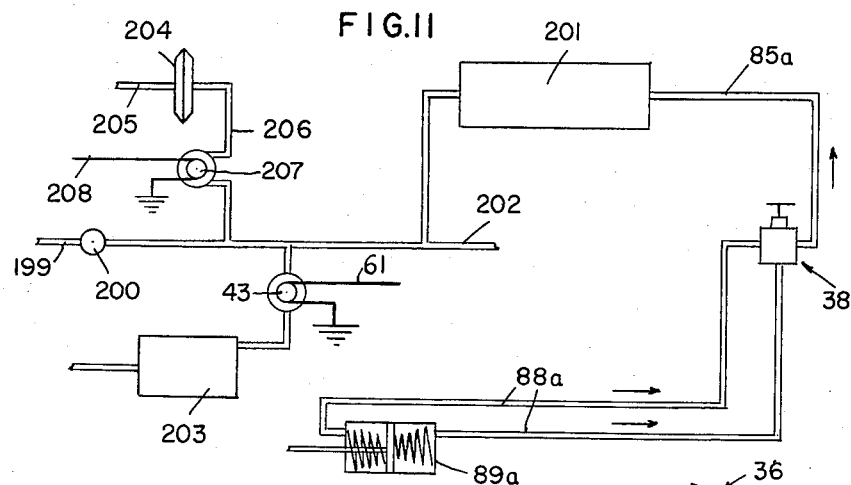
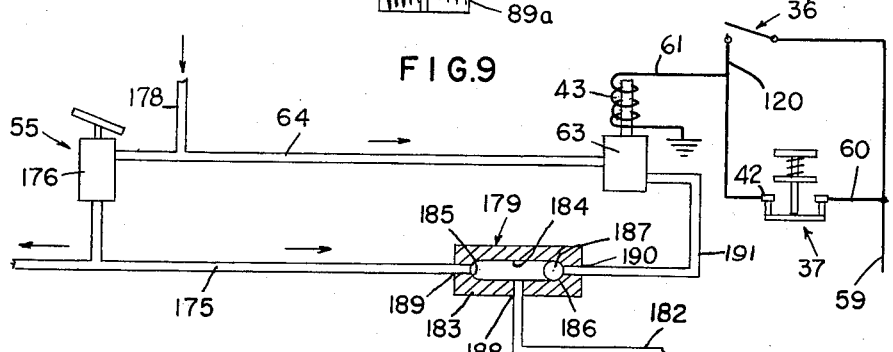

United States Patent Office 3,059,716
Patented Oct. 23, 1962

3,059,716
ONE-MAN OPERATION REMOTE CONTROL
MECHANISM FOR MOTOR VEHICLES
Lavern R. Iserman, Highway 3 E., Waverly, Iowa, and
Robert E. Stuck, 439 W. 101st St., Chicago, Ill.
Filed May 4, 1959, Ser. No. 810,621
7 Claims. (Cl. 180—77)

This invention relates generally to improvements in the operation and control of wheeled vehicles and more particularly to mechanism whereby a motor vehicle may be remotely controlled by one operator.

In the operation of certain types of motor vehicles such, for example, as collection vehicles of the type employed by sanitary departments of towns and cities for collecting garbage and trash, it is the general practice to have at least two men working on one vehicle, one man to do the driving and the other one to perform the operations of picking up the material to be collected and placing it in the receptacle forming the body of the vehicle. As is, of course, well known, this procedure involves the continuous starting and stopping of the vehicle as it is the usual practice for the driver to move the vehicle ahead possibly 75 or 100 feet or more, then stop and wait for the other attendant to pick up the material to be collected and deposit it in the vehicle body, whereupon the other attendant either walks along while the vehicle moves to the next stopping place or rides on the running board of the machine. In this type of operation if an attempt is made to have one man only operate the vehicle, this means that the man must be repeatedly climbing into and out of the vehicle cab, which is excessively tiring and is also time consuming, and a good proportion of the consumed time is taken up in the performance of the various actions necessary, such as the shifting of gears and setting the brakes before the vehicle can be left, and then the further shifting of the gears and the releasing of the brakes when the attendant returns to the cab to move along for another short distance.

Obviously in view of the foregoing, any system which will facilitate the operation of a vehicle of the character described by a single attendant without increasing the work of the attendant or in such a manner that the attendant will not become any more tired than would be the case if a separate operator were present to run the vehicle and also any mechanism by which a single attendant could operate the vehicle and make the collections without greatly increasing the time consumed for the work, is of obvious value and, therefore, it is a particular object of the present invention to provide apparatus by means of which the operations above referred to can be performed by a single attendant and the stated obvious advantages thereof obtained.

Another object of the invention is to provide a new and novel mechanism designed and arranged for the outside remote control of the vehicle by one man and without affecting the conventional mechanism of the vehicle by which the latter may be operated from within the vehicle cab in the usual manner.

Another object of the invention is to provide a remote control mechanism constructed and arranged whereby an operator may be able to control the starting, stopping and steering operations of the vehicle from the running board thereof whereby the operator is in a position when the vehicle is moving to facilitate his leaving the vehicle and returning to it with a minimum of effort.

Still another object of the invention is to provide in mechanism of the above described character a new and novel arrangement whereby an operator of the vehicle while controlling the latter from a position on the left side running board, will be able to view moving vehicles on the far or right side from the operator, whereby the vehicle may be controlled with the maximum of safety.

Still another object of the invention is to provide apparatus for controlling motor vehicle operation from a position remote from the normal control position, which apparatus will operate on any type of brake system, either vacuum, hydraulic or air, by reason of the novel arrangement of the parts making up the apparatus whereby the same can be tied into the selected conventional brake system.

Still another object of the invention is to provide a new and novel apparatus of the character stated which is adapted to be set up so as to be operable in connection with and upon the conventional mechanical clutch of a truck or similar vehicle, from a remote position but which will not interfere in any manner with the arrangement or the operation of the said conventional mechanical clutch operator when it is desired that the latter be actuated in the conventional manner from the cab of the vehicle.

A still further object of the invention is to provide means on the running board of the motor vehicle in association with which the present improved or novel mechanism is employed for controlling the operation of the conventional brakes of the vehicle and in association with the running board control means there is provided a second hand control means for the same purpose and wherein the running board control means is in the nature of a dead man switch by means of which the rider on the running board maintains the brakes inoperative while the vehicle is moving.

Another object of the invention is to provide in a mechanism of the character stated having an electrical system for effecting the actuation of certain elements of the mechanism, a master switch located in the vehicle cab which is adapted to have at least three positions, namely, an "off" position, an "on" position, for cab control of the vehicle electrical system, and an "on" position for remote control of the vehicle electrical system and of the electrically operated elements or units forming a part of the mechanism.

Another object of the invention is to provide in a remote control apparatus constructed in accordance with the present invention, an electrical steering means associated with the steering column of the motor vehicle and by means of which remote control steering of the vehicle by a rider on the vehicle running board becomes possible but which electrically operated steering means is designed so that it will not produce any resistance to the manual operation of the conventional steering wheel shaft by a driver in the vehicle cab.

Another object of the invention is to provide in mechanism of the character hereinbefore stated, a gear shift lever control operable from a position remote from the conventional cab enclosed control lever, by means of either the regular air brake or vacuum brake system and which control functions to move the shift lever between either of two selected positions, namely, the neutral position or the low gear drive position when the control is operatively coupled with the shift lever.

In a general way the invention envisions the incorporation with a motor vehicle having a conventional cab and a body structure, more particularly a body such as may be used by collectors of trash and garbage, of an electrical control mechanism by means of which the conventional vehicle units such as the steering wheel, gear shift, clutch and brake, can be effectively operated by a man riding on the vehicle running board so that he can start and stop the vehicle easily and quickly so as to carry out the job of collecting material along a particular route and such mechanism embodies a series of control switches or buttons and a control valve for vacuum or air operating means for certain of the units of the mechanism, all mounted on a panel or box on the back of the cab or some convenient location on the cab structure where it can be easily reached by the person riding on the running board. In addition the mechanism includes a foot operated means on the running board by which the person standing thereon can effectively manipulate the conventional vehicle clutch, together with a foot actuated control switch which functions as a dead man switch and which it is necessary for the rider on the running board to maintain open by foot pressure at all times while he is on the running board and effecting the movement of the vehicle.

The invention will be best understood from a consideration of the following detail description taken in connection with the accompanying drawings forming part of the specification, with the understanding, however, that the invention is not confined to a strict conformity with the showing of the drawings but may be changed or modified so long as such changes or modifications mark no material departure from the salient features of the invention as expressed in the appended claims.

In the drawings:

FIG. 1 is a view in side elevation of the forward portion of a collection truck such as might be used by a garbage or trash collector, with portions thereof being broken away and in section and illustrating the position of certain of the units going to make up the remote control mechanism;

FIG. 2 is a top plan view of the structure shown in FIG. 1 and wherein a portion of the running board is broken away to show the foot operated clutch control and the dead man switch pedal;

FIG. 3 is a circuit diagram for the electrical system and for portions of the air, hydraulic or vacuum system by which actuation of parts, such as the brakes, gear shift and power take-off is effected from the remote control panel;

FIG. 4 is a view on an enlarged scale of the vehicle cab and a portion of the body, which cab and body are more or less conventionally illustrated and showing certain of the control units appearing in the circuit diagram forming FIG. 3;

FIG. 5 is a view illustrating the operating means for the gear shift lever showing conduits by means of which air pressure or vacuum may be introduced into the control for moving the shift lever;

FIG. 6 is a detail section taken substantially on the line 6—6 of FIG. 5;

FIG. 7 is a view illustrating the hydraulic means operable from the running board of the vehicle for effecting the actuation of the vehicle clutch from the remote position;

FIG. 8 is a diagrammatic view illustrating the air brake system for the truck coupled with air operated units for effecting the actuation of the gear shift and power take-off;

FIG. 9 is a detail view illustrating the shuttle valve unit interposed in the air lines for effecting the desired directional flow of air under the control either of the foot operated valve in the cab or the solenoid operated valve which is selectively controlled by the dead man switch and the control panel switch;

FIG. 10 is a simplified air circuit diagram showing the electrical or solenoid operated valves employed therein together with the shuttle valve;

FIG. 11 is a simplified circuit diagram corresponding to FIG. 10, but showing the vacuum system;

FIG. 12 is a detail illustrating an electrical remote control arrangement for actuating the gear shift lever;

FIG. 13 is a detail view on an enlarged scale of the power take-off diaphragm unit.

Referring now more particulaly to the drawings, reference will first be had to FIGS. 1 and 2. In these figures the forward end of a motor vehicle and a body structure thereon are conventionally illustrated for the purpose of illustrating the mounting of certain of the units making up parts of the complete remote control mechanism. Accordingly it will be understood that the construction and arrangement of the vehicle as diagrammatically shown in these figures is not intended to in any way limit the type of vehicular construction upon which the remote control mechanism may be used.

In the figures referred to, the numeral 10 generally designates a motor vehicle wherein the engine covering hood is designated 12 and the cab is designated 14.

The numeral 16 designates a portion of the chassis frame of the vehicle and the forward end of which is supported in the usual manner by tired wheels, one only of which is shown and designated 17.

Rearwardly of the cab structure the chassis supports a body 18 which may be in the form of an open top receptacle or may be of any other desired form suitable to the use to which the vehicle is to be put.

The numeral 20 designates the right hand running board and the numeral 22 designates the left hand running board. This latter running board is, of course, on the side nearest to the vehicle steering wheel which is here designated 24.

The body 18 has secured to the left side and at the forward end thereof the forwardly and outwardly extending hand hold and brace which is generally designated 26. This hand hold and brace is here shown as comprising a substantially U-shaped frame disposed on its side with the ends of the side portions 27 secured as by welding or in any other suitable manner to the body 18 and with the transverse portion and the major portion of each of the parallel sides 27 extending forwardly of the body 18, such transverse portion between the side portions or legs 27 being designated 28. As shown in the top plan view forming FIG. 2, the hand hold projects slightly forwardly of the rearmost portion of the running board 22 and in addition, since it extends outwardly with respect to the cab and the running board, it will be seen that a person standing on the running board can brace himself against the forward wall of the body 18 and between the hand hold 26 and the adjacent side of the cab. At the same time the hand hold in the vehicle part 28 thereof provides a suitable grasping means for the operator of the vehicle whereby to assist himself in swinging onto the running board.

Attached to the back of the cab 14 or mounted in any other suitable manner between the back of the cab and the forward part of the body 18 is the remote control switch and valve unit or remote control panel which is generally designated 29 and in connection with which a detailed description will be given in the description of the electrical and fluid system or circuit shown in FIG. 3.

The numeral 30 designates a rear view mirror which is used in connection with the remote control mechanism and this mirror is mounted on the right hand side of the vehicle in a position which will enable an operator of the vehicle while standing on the left hand running board to see to the rear of the vehicle on the right side so as to observe any other motor vehicles which may be approaching and thus safely operate his own machine.

This mirror can be mounted in any desired manner but is here shown as attached to a bracket arm 30a which is secured to the forward side of the body 18 to extend upwardly therefrom so as to maintain the mirror 30 at an elevation above the body 18 and at the proper angle to the longitudinal center of the vehicle structure so as to project the reflections of vehicles approaching from the rear transversely of the vehicle to the rider on the opposite side.

Referring now more particularly to FIGS. 3 and 4 of the drawings, these figures illustrate the electrical circuit and the control panel switches together with electrically operated units by which a vacuum is employed for actuating certain of the mechanical units. In other words, FIG. 3 shows diagrammatically the electrical system with pipes and other mechanical parts associated with the control and actuation of the brakes, the gear shift and the engine accelerating means and also a power take-off unit, while FIG. 4 illustrates possible locations of certain of the mechanical units in and adjacent to the vehicle cab, together with the connection of the units with the conventional parts of the vehicle normally intended to be operated from within the cab.

Considering first FIG. 3, the control panel is shown having mounted thereon a series of electric circuit controlling switches. The numeral 31 designates the remote control ignition switch for the electrical system of the vehicle motor.

The numeral 32 generally designates a momentary contact steering control switch. This switch is of a construction well known which has two operating or circuit energizing positions and a neutral position. In other words, it may be defined as a single-pole double-throw switch and is of conventional form wherein when the switch blade has been moved to one or the other of two circuit energizing positions and then released, it will return to its "off" position and in this position it is shown in FIG. 3.

The numeral 33 generally designates the engine acceleration switch whereby increasing the speed of the engine may be effected from the remote control position.

The numeral 34 generally designates the switch controlling the power take-off actuating mechanism hereinafter more particularly described.

The numeral 35 generally designates a push button type starter switch and the numeral 36 generally designates the remote control brake operating switch which is hand operated and which is in parallel with a normally closed foot controlled brake operating switch which is generally designated 37.

Also mounted in a convenient position either on the control panel 29 or adjacent thereto is a valve unit which is generally designated 38 and by means of which fluid or vacuum means may be employed in the manner hereinafter described for effecting the shifting of the gears to the neutral or low gear position as desired.

The lay-out of FIG. 3 and the illustration forming FIG. 4 is for the employment of air pressure in connection with the actuation of the gear shift, the brakes and the power take-off and it will, of course, be understood that when the system here illustrated is employed, the truck will carry a conventional compressed air tank and means operable from the vehicle motor for maintaining a suitable pressure of air in the tank for use.

Use may also be made of electrical means as hereinafter set forth, for controlling the actuation of the shift lever by air pressure or vacuum and vacuum or air pressure may also be used, as hereinafter illustrated and described in connection with the diagrams forming FIGS. 10 and 11, for actuating the butterfly valve of the carburetor for controlling acceleration of the vehicle.

The foot control brake switch or dead man switch generally designated 37 is supported upon the left running board 22 and embodies a pedal 39 connected by a stem 40 with a bridging conductor bar 41 which in the closed position of the switch, electrically couples contacts 42 in a circuit which has included therein a brake solenoid 43. Spring means 44 normally urges the stem 40 in a direction to close the electrical connection between the terminals 42 and thus it will be seen that when the operator of the vehicle leaves the running board 22 and, therefore, removes his foot from the pedal 39, the brakes will be automatically set as about to be described, but when the operator is on the running board and the vehicle is moving, he maintains his foot on the pedal 39 to keep open the circuit in which the brake solenoid 43 is located.

The numeral 45 designates the vehicle battery by which electric current is supplied to the several circuits. One side of this battery is grounded in the usual manner as at 46 and the opposite side of the battery is in electrical connection with a three-way switch or a single-pole double-throw switch which is generally designated 47 and which is located within the vehicle cab 14 where it is under the control of the operator when he is running the vehicle from within the cab.

In addition to this main control switch in the cab, which switch includes the blade 48 and the two terminals 49 and 50, there are provided a plurality of operating mechanisms adapted to operate the essential driving mechanisms of the vehicle. In these operating mechanisms there are included the electrical acceleration operator which is generally designated 51, a shifting operator here generally designated 52 and which is in the lay-out actuated by compressed air, a steering operator which is generally designated 53, a clutching operator generally designated 54 and a braking operator which is generally designated 55. There is also provided the parallel ignition circuit designated generally by the numeral 56 for effecting the ignition of the truck electrical system and a starter operator designated generally by the numeral 57.

In further reference to the remote control panel 29 there is designated in FIG. 4, as a sheathed multi-wire cable 58, a plurality of electric current conductors through which the several circuits are energized and which conductors will be hereinafter individually designated.

*Remote Controls*

As shown in FIG. 3, the numeral 59 designates a feeder wire or conductor, or hot wire, which leads to the blades of the several control switches on the panel 29. One of the terminals 42 for the foot control brake switch is connected to this feed wire by the conductor 60 while the other terminal 42 is connected by the wire 61 with the brake control solenoid 43, which is grounded as at 62. This solenoid 43 when energized, effects the operation of the brake valve 63 to open the latter and permit compressed air to pass from the compressed air supply line 64 to the distributing pipeline 65 which feeds the conventional air brakes shown in and hereinafter particularly referred to in connection with the description of FIG. 8.

The control means for the vehicle clutch is shown in FIG. 7. This includes a fluid cylinder 66 which is mounted beneath the running board 22, as shown in FIGS. 1 and 2. This cylinder encases the piston 67 and the piston is operatively connected by the rod 68 extending through the back end of the cylinder and pivotally coupled to a bell crank 69 pivotally mounted upon the under side of the running board in a suitable manner as indicated at 69'. The rod 68 is pivoted to one arm of the bell crank and the other arm of the bell crank which is designated 69a is of substantial length and extends rearwardly beneath the running board and is connected with an upward extension 70 which passes up through an opening in the running board and has a foot pedal 71 mounted upon its upper end.

The fluid cylinder 66 also encases a control spring 72 which normally urges movement of the piston rearwardly as shown.

The forward end of the fluid cylinder 66 is connected by the pipe 73 with one end of a fluid cylinder 74 mounted on the vehicle in an operative relationship with the clutch operating foot lever as shown in FIG. 7, which clutch operating foot lever is here designated 75. Within the cylinder 74 is slidably mounted the fluid operated piston 76 upon the rear side of which is located the spring 77 which normally urges movement of the piston toward the end of the cylinder with which the pipe 73 is connected and connected with the piston 76 is the threaded stem 78 which passes out of the opposite end of the cylinder from the end which is supplied with fluid through the pipe 73 and on this stem there is threaded the adjustable stop nut 79. Beyond the stop nut 79 from the cylinder 74 the piston rod passes through a stop 80 which is fixed against movement in a suitable manner.

The numeral 81 designates the clutch operating arm which is connected with the clutch pedal by the coupling rod 82. This rod 82 is threaded through the fork as illustrated and is aligned with the piston rod 78 and carries on the end opposing the end of the piston rod 78, an abutment plate 83. This latter plate is normally spaced from the rod 78 sufficiently to permit foot operation of the clutch pedal, but the spacing is such that when sufficient fluid pressure is applied to the piston 76 by means of the fluid forced into the cylinder 74 by foot operation of the pedal 71, the rod 78 will move against the abutment plate 83 and effect desired actuation of the vehicle clutch.

In the arrangement illustrated diagrammatically in FIG. 3 and in the employment of the operating units shown in FIG. 4, the use of compressed air is assumed for actuating the illustrated units and it will, of course, be understood that in this set-up the vehicle or truck will carry a conventional air compressor and air tank from which the air under pressure may be drawn for actuating the units.

The control valve 38 which is a part of or adjacent to the remote control switches on the switch panel 29 may be of any suitable character by means of which air can be taken from the source, not shown, and conducted by way of the pipe 64, through the pipe 84 to the pipeline 85 which leads into the body 86 of the manually controlled or actuated valve 38. By actuation of the valve lever 87 in the proper direction from its closed position the air may be selectively directed through the pipelines 88 into the piston cylinder 89. This cylinder houses in a normal intermediate position the piston 90 having balancing springs 91 at opposite sides thereof which function to keep the piston in a centralized position in the cylinder and the pipelines 88 enter the cylinder adjacent to the ends thereof and at opposite sides of the piston 90, as shown in FIG. 5.

The piston has a rod 92 connected at one end therewith and extending outwardly through an end of the cylinder and the cylinder is mounted on suitable supports 93 rearwardly of the vehicle gear shift lever 94. The outer end of the rod 92 is operatively and detachably coupled as at 95 to a clamp 96 which encircles and grips the lower end of the gear shift lever 94. The coupling 95 here illustrated is of a type which facilitates the quick and easy disconnection of the rod 92 from the clamp 96, for example, this coupling may include the removable pin 97 which is extended through the interconnected portions of the rod and clamp, as illustrated in FIG. 6.

*Power Take-Off*

The system illustrated in FIG. 3 also includes a power take-off actuating mechanism generally designated 98. This mechanism embodies a diaphragm chamber 99 having therein a conventional diaphragm 100 which has operatively connected with it on one side an end of an outwardly extending stem 101 which in turn is pivotally connected with the power take-off shifting shaft 102 operatively coupled to the conventional power take-off (not shown) of the vehicle. This diaphragm 100 is spring loaded as indicated at 103 whereby the diaphragm is maintained centralized in the chamber 99 and the opposite side of the chamber has connected therewith the compressed air supply pipe 104 whereby upon the introduction of air under pressure, the diaphragm will be moved in the proper direction to move the power take-off shifting shaft 102, as desired. The numeral 105 designates an electric solenoid operated valve which is connected on its outlet side with the pipe 104 and on its inlet side it is connected with the pipeline 84 whereby when the valve is shifted to open position, air will be introduced to the diaphragm chamber 99. This valve 105 is actuated by the solenoid 106 the connections for which will be hereinafter set forth.

Associated with the solenoid 106 is a relay 107 for effecting, when energized, the closing of the electric contacts 108 and 109. This relay, as illustrated, embodies the coil 110 one side of which is connected by the conductor 111 with one terminal of the power take-off switch 34 on the remote control panel, the other side of the switch being connected as at 112 with the electric feed or hot wire 59. The other side of the coil 110 is grounded as shown at 113.

The electrical system as shown includes the conductor 114 which is connected with the switch blade 48 and the contact 108 of the relay 107 is connected by the conductor 115 with this conductor 114. The electromagnet coil 106 is connected at one end with the conductor 106ᵃ, as illustrated, and is also connected with the terminal 116 of a switch 117 positioned for operation from within the vehicle cab and the movable element or blade of this switch is connected to the current conductor 114 by the wire or conductor 118.

The remote control switch 36 provides means for manual energization of the brake solenoid 43, this switch being connected on the switch blade side by the conductor 119 while the terminal with which the switch blade is intended to connect is connected by the conductor 120 with the conductor 61 at a point between the dead man switch and the brake solenoid. By this means it will be seen that the operator, even while holding the foot control brake or dead man brake 37 open with his foot, can manually effect the application and release of the brakes by opening or closing the switch 36.

Referring now to FIG. 4, there is shown in connection with the accelerator operator 51 the conventional linkage for operating the butterfly valve lever 121 and this linkage includes a pair of links 122 and 123 interconnected by the bell crank 124, whereby depression of the accelerator pedal 125 effects the actuation of the butterfly valve.

The accelerator operating mechanism which is generally designated 51 includes a first relay 126 and a second relay 127 mounted on the common support 128 which in turn is mounted upon a suitable part of the chassis or other part of the vehicle structure.

As will be understood upon referring now to FIG. 3 as well as FIG. 4, upon actuation of the first relay 126 the relay will be closed and power will be supplied to the second relay 127 to thereby effect the upward movement of the relay armature actuated rod 129 which, through the medium of the link 121, will rotate the butterfly valve toward open position for accelerating the vehicle engine.

It will be seen upon further consideration of FIG. 3 that this action is brought about by the closing of the acceleration switch 33 on the remote control panel whereby current will be transmitted from the feed line 59 through the conductor 130 to the switch blade and passed through the blade to the conductor 131 which will energize the coil of the first relay. This will effect the actuation of the armature 132 forming a part of the first relay, bringing it into electrical connection with the terminal 133 which is connected by the conductor 134 with the current conducting line 114. Thus current can be transmitted to the coil 135 of the second relay to bring about the closing of the latter in an obvious manner.

Returning now to a consideration of FIG. 4, it will be seen that the post upon which the steering wheel 24 is mounted has secured thereto the reversible electric motor 136. The motor shaft has secured thereto a pinion 137 and this is in toothed connection with an internal ring gear 138 secured to and concentric with the steering wheel 24. Thus it will be apparent that operation of the motor 136 in either of its two directions will effect the turning of the steering wheel and the steering of the vehicle.

A plurality of relays 139, 140, 141 and 142 are mounted in a suitable location inside of the truck cab.

Upon now referring to FIG. 3, it will be seen that upon the closing of the momentary contact steering switch 32 so as to close either of the circuits for the conductors 143 and 144, either the set of relays 139 and 142 or the set of relays 140 and 141 will be actuated. Assuming that the relays 139 and 142 are actuated, it will be seen that the armatures 145 and 146 will be moved to circuit closing position while the armatures 147 and 148 of the relays 140 and 141 will remain open. Electric current will then be transmitted from the conductor 114 by way of the armature 146 and conductor 149 to and through the motor field coil 150 and from this coil through conductor 151 through the closed armature 145 to the motor armature 146 and to ground, thereby rotating the reversible motor in a first direction. When the steering wheels have been turned to the desired extent, the momentary contact switch is released or opened. If it be desired to turn the vehicle wheels in the opposite direction, the momentary contact switch is thrown in the opposite direction from that to which it was previously moved so as to effect the closing of the relay armatures 147 and 148 to effect transmission of current from the line 114 through the conductor 152 and in the reverse direction through the motor field coil 150 to the motor armature 146 to effect the reverse rotation of the motor.

The switch 47 is, as previously stated, provided to effect the closing of the ignition circuit or system 153 from within the vehicle cab and when the remote control system is put into operation, this switch is thrown to the opposite position to charge the conductor or feed wire 59. Following this, the ignition system may be energized from the remote control panel by closing the switch 31, as hereinbefore referred to.

FIG. 4 illustrates the starter relay which is shown in detail in FIG. 3 in connection with the starter operator which is generally designated 57. This relay is here generally designated 154. Upon the closing of the push button starter switch 35 on the remote control panel current will be transmitted from the feed wire 59 through the conductor 155 to one side of the switch 35 and transmitted therethrough by way of the conductor 156 to the solenoid coil 157. This coil forms a part of a relay which closes a bridging contact 158 across the two terminals 159 and effects the transmission of electric current from the conductor 114, by way of the conductors 160 and 161 to the starter motor 162. Immediately following the energization of the coil 157 to close the relay, the plunger 163 will be actuated to effect the movement of the "Bendix" kick arm 164 in the proper direction to effect the meshing of the gears 165 and 166 in the known conventional manner so that upon the rotation of the motor the desired rotation will be transmitted through the "Bendix" mechanism to the engine fly wheel, as is conventional.

As is well known, the "Bendix" mechanism is so designed that as soon as the vehicle engine starts, the gears 165 and 166 will be thrown out of mesh.

Referring now to FIG. 8, there is illustrated a diagrammatic lay-out of the air system controlled by elements of the circuit shown in FIG. 3 and adapted to be actuated either from the cab or from the remote control panel. In this FIGURE, the reference character 167 designates the vehicle front wheels and the numerals 168, 169 designate, respectively, two sets of dual wheels at the rear of the vehicle.

A compressed air tank is diagrammatically illustrated and designated 170 while the motor operated compressor is designated 171 and is connected by the pipeline 172 with the air tank.

At the front wheels there is shown diagrammatically the compressed air brakes 173 connected by a pipeline 174 with an air distributing pipeline 175 which is connected with the outlet side of a suitable foot controlled air valve 176. The inlet side of this air valve, which includes the foot pedal 177, is connected with the air line 178 leading from the tank and with the brake solenoid actuated valve 63 hereinbefore referred to, by way of the pipeline 64.

The numeral 179 designates an air shuttle valve for directing the compressed air flow to the air brakes of the rear wheels upon the opening of the brake solenoid controlled valve 63 or upon the actuation and opening of the foot operated valve 176. When the foot operated valve 176 is operated the air will be directed forwardly to the front brakes 173 and through the shuttle valve 179 to the air brakes 180 and 181 for the rear wheels, by way of the pipeline 182.

The shuttle valve consists of the valve body 183 having an elongate valve ball chamber 184 therein with seats at opposite ends, as indicated at 185 and 186 for the single valve ball 187. Intermediate these seats the body 183 has an air discharge port 188 which has the pipeline 182 connected therewith. At the end of the body 183 where the seat 185 is located is the port 189 with which the pipeline 175 is connected while at the opposite end of the body 183 where the seat 186 is located is the port 190 with which is connected the pipe 191 which transmits the air from the valve 63 when the valve is opened to admit air by way of the line 64.

It will be readily seen that when the foot valve 176 is opened the air admitted to the pipeline 175 will project the valve ball 187 to the seat 186 and the air will then pass out into the pipeline 182.

When the brake solenoid 43 is energized to open the valve 63, then the compressed air will be passed from the pipe 64 through the valve 63 to the pipe 191 and will project the ball valve to the seat 185 and the air will then pass out through the port 188 to the pipeline 182.

The diagram forming FIG. 8 also illustrates the air conducting lines employed for effecting the operation of the gear shift lever and the power take-off, together with the remote control switches previously described and also the switch operable from within the cab, also previously described, by which actuation of the power take-off can be effected by the driver from the cab. As will thus be clear from the diagram, the other control switches on the panel 29 will be supplied from the incompletely illustrated conductors.

FIG. 10 repeats in part the diagram of FIG. 8, but illustrates the connection with the air lines of a compressed air actuating means for the engine accelerator. This actuating means is here designated 192 and embodies a piston cylinder 193 enclosing a piston 194 having a rod 195 extending from one end of the cylinder and operatively coupled with an actuator for the butterfly valve of the carburetor, such connection being made, for example, with the end of the lever 121 shown in FIG. 3 as having the solenoid armature 129 connected therewith. The opposite end of the cylinder 193 is illustrated as having a pipeline 196 connected therewith and this pipeline is connected with the outlet pipe of the compressed air tank, such, for example, as the pipe 178, and has interposed therein the electric solenoid valve 197 which when energized will open the line to the cylinder 193 to admit air to the cylinder. The solenoid valve 197 is energized upon the closing of the accelerator switch 33 and upon completion of this operation the electric current will be transmitted to the solenoid valve by way of the conductor 198, as will be readily observed.

This air diagram forming FIG. 10 also shows the hand operated valve 38 by means of which the compressed air may be selectively introduced to the ends of the gear shift cylinder 89 to operate the latter in the manner described in connection with FIGS. 3 and 4.

FIG. 11 illustrates schematically the vacuum system which may be employed for the actuation of the brakes, the shift lever and accelerator operating mechanism. In this diagram the reference character 199 designates the pipe connection with the engine intake manifold which pipe has therein a check valve 200. The pipe 199 is connected through the check valve with the vacuum tank 201 and to the pipe line 202 extending rearwardly to the carrier Hydrovac mechanism such, for example, as that shown in Patent No. 2,468,706, by means of which the rear wheel brakes, not shown, may be operated. The front brake cylinders, one of which is designated 203, are connected with the vacuum line through the solenoid actuated valve unit 43 which is electrically connected, as in the system illustrated in FIG. 3, with the remote control panel switch 36 and the foot control or dead man switch 37.

The gear shift operator which includes the cylinder 89a corresponds in its construction and manner in which it is connected with the gear shift lever, to the air pressure piston cylinder 89, but is operated by means of vacuum through pipelines 88a operatively connected with the manually shiftable valve 38 which in turn is connected by the pipeline 85a with the vacuum tank 201.

For the control of the acceleration operator by the vacuum there is provided the diaphragm casing or chamber 204 in which the diaphragm is connected on one side through the medium of the actuator rod 205, with the butterfly valve control lever, such as the lever 121 hereinbefore referred to. The other side of the vacuum chamber or housing is connected by the pipeline 206 with the vacuum line 199 through the interposed electric solenoid operated valve 207 which corresponds to the valve 197 described in connection with the compressed air operating means for the actuation of the butterfly valve. In the employment of the vacuum system as here illustrated, the electric current conductor leading from the acceleration switch 33 on the remote control panel is designated 208.

It is believed that the operation of both the compressed air system, as diagrammed in FIG. 10, and the vacuum system as diagrammed in FIG. 11, will be readily apparent without further explanation in view of the detailed description given in connection with the system illustrated in FIGS. 3 and 4.

In FIGS. 3 and 4 the gear shift lever has been described as being operated by compressed air which is selectively admitted to the opposite ends of the piston cylinder 89 through the actuation of the distributing valve 38 mounted adjacent to the remote control panel. However, it is also contemplated to use in place of the valve 38, electrical means for admitting compressed air to, or for employing vacuum in the piston cylinder 89 and FIG. 12 illustrates only the portion of the electrical control operable from the panel 29 for moving the gear shift lever. In this figure the same reference characters will be employed for those parts which are common to this figure and to FIG. 3. As illustrated in this FIG. 12, there are provided the two solenoid or electromagnetic valves 209 each of which has an outlet conduit 210 connected therewith and leading into one end of the piston cylinder 89. Compressed air supply pipes 211 also lead into the valves 209 and the valves in their internal structure embody the shiftable valve elements 212 which are controlled by the solenoid coils 213. As will be apparent, the energization of either of these coils 213 will effect the shifting of the respective valve element off of its seat to permit transmission of fluid pressure through the valve into the corresponding end of the piston cylinder 89, or vice versa, where vacuum is employed, the opening of either valve will bring about the reduction of air pressure in the associated end of the piston cylinder to shift the piston in the manner desired.

On the control panel 29 there is provided a single-pole double-throw control switch which is generally designated 214. This switch has an "off" position and two "on" positions and in either of the "on" position the pole will engage one of the contacts 214' and one of the solenoid coils 213 will be energized to bring about the gear shifting action desired, as will be readily apparent.

While the foregoing description and illustration have been directed to the placement of the dead man switch and the clutch control on a running board at the side of the vehicle in the usual running board location, it is also contemplated to place these controls on a rear step or platform which would be conveniently low, like the conventional running board, to permit the attendant to easily step off onto the ground and back onto the platform or running board in the course of operating the vehicle for picking up materials of the character stated.

It is, of course, conceivable that some types of vehicles used for picking up materials such as trash, garbage or other things, would have a body constructed so that the materials could be introduced thereinto from the rear while other bodies may be equipped merely with an open top such as many trash collecting vehicles are constructed, which would permit the operator to ride on the conventional running board and place the collected material into the body by either dumping it where the body is low enough, or tossing it up and into the body in those constructions where the body is of substantial height.

Of course, it will be understood that where the foot operated units may be located on a step or platform at the back of the vehicle body, the remote control unit 29 would also be located in a position where it could be conveniently reached by the rider.

By providing the power take-off unit it will be apparent that in those vehicles where the body is mounted to be elevated for dumping, the elevating mechanism would be operatively connected with the power take-off so that upon the energization of the latter, the vehicle body could be raised and lowered for accomplishing the dumping operations and returning the body to its normal position. No illustration has been given of mechanism for actuating a dump body as it will be understood that such mechanisms are of standard and well known character and it will, therefore, be apparent that the manner of effecting the coupling of the power take-off with such mechanism would be readily obvious.

In the operation of the present invention, where the remote control switches and valve would be mounted on the back of the vehicle cab and the foot controls are on the conventional running board, the operator will stand on the running board and may brace himself against the inner side of the hand hold or bracing frame 26 while the vehicle is in motion. It will be seen that while standing in this position the operator can and must keep his foot pressed on the pedal 39 of the dead man switch so as to keep the switch open and thus prevent the application of the vehicle brakes. During his occupancy of the running board, and while his foot is maintaining the dead man switch open, normal operation of the brakes for slowing up the vehicle or stopping when necessary, can be effected by the hand manipulation of the switch 36.

In the operation of the vehicle to the location where the attendant is to start his work of picking up material at short intervals, the attendant will occupy the conventional seat and operate the conventional controls from within the cab in the usual manner and at the beginning of the operation the switch 47 will be turned for energization of the conventional ignition system and, as will be seen upon reference to the circuit diagram forming FIG. 3, when the switch is in such position, the current from the battery will be cut off from the distributor line 59 leading to the remote control unit 29. The usual or conventional starter switch can then be closed for starting the motor as in the conventional manner by means of the mechanism 154.

Also when the vehicle is to be operated from the cab and the steering controlled by the hand operation of the wheel 24, and the brakes and clutch operated by the conventional foot levers or pedals, where air brakes are employed, as shown in the diagram forming FIG. 8, it will be seen that the air can be transmitted directly to the brakes as desired, without interference from the auxiliary control mechanism involving the solenoid valve 63. Also it will be seen upon reference to FIG. 7 that the clutch pedal can be operated by the occupant of the cab without interference from the remote control operating mechanism.

When the various control units of the vehicle are operated from the cab, the shift lever will be uncoupled from the power actuated shaft 92 by removing the coupling pin 95 shown in FIG. 6.

When the operator desires to switch the controls over to the remote control system, before leaving the cab he will throw the switch 47 over to connect the switch blade 48 with the terminal 49. This cuts out the conventional ignition system and throws the current supply into the conductor line 59 leading to the remote control switch board on which the switches 31 to 35 are mounted. Also it will be apparent that as soon as the switch 47 is thrown over for remote control, the foot operated brake control switch 37, being normally in closed position, will pass current to the brake solenoid 43 and effect the application of the brakes so that the operator can safely leave the cab and move to his position on the running board or upon the rear step or platform, as the case may be. Upon mounting the running board, the operator may then close the ignition circuit by means of the switch 31 and following this operation, by closing the switch 35, the starter mechanism can be energized to effect starting of the motor.

Before proceeding to leave the cab, however, the shift control rod 92 is recoupled with the shift lever 94 in the manner shown in FIGS. 5 and 6. When this coupling is established, the shift lever 94 will be in neutral position, as is, of course, necessary when the vehicle motor is started.

Release of the brakes may then be effected by the operator placing his foot on the pedal 39 of the foot control switch 37 so as to open the brake solenoid circuit permitting the brakes to be released and either prior to or immediately following this operation, the gear mechanism can be shifted to low drive position by actuation of the valve lever 87, when the system is set up as shown in FIG. 3, in the right direction to effect the movement of the piston 90, as required, and acceleration of the engine is effected by the manual closing of the switch 33 to open the butterfly valve of the carburetor in the manner described.

Forward movement of the vehicle then takes place, and steering is effected by means of the switch 32 so as to transmit power to the steering shaft in the manner hereinbefore described.

During the operation of the vehicle in the manner stated, slowing or stopping the movement of the vehicle can be effected manually by means of the switch 36 even though the switch 37 is being held open, but obviously if the driver leaves the running board or the step intentionally or accidentally, by taking his foot off the switch pedal 39, the brakes will be immediately applied to stop the advance of the vehicle.

Actuation of the power take-off for any desired reason or purpose may obviously be effected by the closing of the switch 34 when the operator is on the running board, or when the operator is in the cab and the switch 34 is open, then the power take-off is controlled by the switch 117 which is located within the cab.

Without repeating all of the preceding description of the operation, it will be apparent that where the brakes may be operated by vacuum, the system shown in FIG. 11 would be employed. Also as indicated in this diagram, the acceleration of the vehicle motor would be vacuum operated through the medium of the diaphragm unit 204 and the gear shifting would be effected by means of the hand valve 38 in the same manner as when air or liquid pressure might be used for operating the brakes.

Also in connection with the use of compressed air, as illustrated in the diagram forming FIG. 10, acceleration may be effected by means of the air operated accelerator cylinder 192 in place of the electrical acceleration mechanism shown in FIG. 3.

Another method of controlling the gear shifting is illustrated in FIG. 12, which method might replace the vacuum or fluid control where the hand valve 38 forms a part of the system, this control of FIG. 12 being entirely electrical, as illustrated. Here, of course, the valve 38 would be eliminated from the unit mounted on the back of the cab and the switch panel would include the additional switch 214 having the two closed positions which would be selectively operated either to put the gear mechanism in low gear or to shift it to neutral position.

In addition to the novel features hereinbefore described and illustrated in the drawings, there is provided a safety means designed to apply the brakes of the motor vehicle where, in the backing of the vehicle, a situation may arise where damage or injury to a person might result. It is well known, of course, that many accidents have occurred from motor vehicles backing into a pedestrian or backing in uncontrolled manner against another car or some other structure and it is, therefore, desirable that a means be provided, particularly in a vehicle structure of the character here illustrated and described, where an operator may ride for a considerable amount of time on a side running board and control the vehicle from that position, whereby the vehicle can be stopped immediately if it should be backed against a pedestrian or other body. Such a safety feature is especially important also in view of the fact that garbage collection trucks and other trucks are frequently of a semi-tractor type.

In accordance with the foregoing there is provided at some relatively low location or position on the rear of the vehicle body, one or more switch units such as is conventionally illustrated in FIG. 3 and generally designated by the reference character 220. This switch is here shown as embodying a button 221 carrying a blade 222 which is adapted to bridge a pair of contacts 223 or 224. One of the contacts, here designated 223, is electrically connected by the wire 225 with the electric current conductor 120 which in turn is connected to the conductor 61 which leads directly to the brake solenoid 43. The other switch terminal 224 is electrically connected by the current conductor 114 which leads from one side of the source of electric potential or storage battery 45 to the single-pole double-throw switch blade 48.

It will accordingly be evident from the foregoing that whether the switch 47 has been thrown to the position where it engages the terminal 50 for closing the ignition circuit from the cab or conventional driver station, or whether it be thrown to the position where it engages contact 49 to thus conduct current from the battery to the switch panel supply conductor 59, the closing of the switch 220 will result in effecting the flow of current to and the charging of the coil of the brake solenoid 43 whereby to effect the application of the vehicle brakes. This action thus takes place upon the closing of the switch 220 regardless of the condition of the panel switch 36 or the "dead man" switch 37. In other words, if both of these switches are open the brakes will be applied when the switch 220 is closed.

While no specific illustration of the mounting of the switch 220 has been made, it will, of course, be apparent that suitable mounting means will be provided upon the rear of the motor vehicle body. Also in order that the switch 220 will be effectively closed no matter what part of the rear side of the vehicle body should be backed into another body, there is provided a long covering leaf 227 which may be hinged along one edge as indicated at 228 to the back of the vehicle body adjacent to the bottom thereof to overlie or cover the button portion 221 of the safety switch. If found desirable or necessary, a suitable spring 229 may be employed for holding the shielding leaf 227 either entirely out of engagement with the button 221 or in light engagement therewith. It will, of course, be evident that in the type of switch 220 selected for the use described the button 221 will be normally urged by suitable spring means, not shown, away from the contacts so that when the spring 229 moves the shielding leaf 227 away from the switch 220, the latter will automatically open.

The power take-off mechanism in addition to being employed in the conventional manner for operating other machinery adjacent to the motor vehicle, may also be employed in trucks having pivoted dump bodies, for effecting the raising and lowering of such body.

In addition to the foregoing, the panel or control switches and air valve may be located at the rear of the motor vehicle body where a rider-operator could be positioned for maintaining remote control operation of the various units of the vehicle.

We claim:

1. As a new combination, a motor vehicle having a conventional driver station together with conventional control for steering means, acceleration means, fluid brakes and means for actuating the latter; a body structure rearwardly of said station, a rider-operator platform supported adjacent to a side of the body structure at a low elevation relative thereto to permit a rider-operator to step off therefrom to the ground and back thereon, a hand-hold fixed to the vehicle adjacent to the platform, a control panel adjacent to the hand-hold and including a plurality of manually actuatable control units, an auxiliary operator respectively for the steering means, the acceleration means and the brake actuating means, the auxiliary operators for the steering means and the acceleration means being electrical and the control units therefor being an electric switch controlling an electric circuit having a respective one of the last named auxiliary operators therein, the auxiliary operator for the brake operating means comprising an electro-magnetically actuated fluid flow controlling valve, the manually actuatable control unit for the electro-magnetically controlled valve being an electric switch controlling an electric circuit having the electromagnet of the fluid flow control valve therein, a foot pedal actuated switch carried by the platform and electrically connected in parallel with the last named switch, and spring means normally urging the foot pedal actuated switch to closed position.

2. As a new combination, a motor vehicle having a conventional driver station together with a source of electric power, a conventional ignition system and conventional control for steering means, acceleration means, clutch actuating means, fluid brakes and brake actuating means, a body structure rearwardly of said station, a rider-operator platform supported adjacent to the body structure at an elevation to permit a rider-operator to conveniently step therefrom onto the ground and back thereon, a control panel supported adjacent to said platform, a single pole double throw switch having the pole electrically connected to said source of electric power and a first and second terminal for selective engagement thereby, the first terminal being connected to said ignition system, an electric current feeder wire leading from the second terminal to said control panel, an electrically actuated auxiliary operator for the steering means and for the acceleration means, switches on said panel and distributor circuits for selectively connecting the feeder wire with the operators for the steering means and the acceleration means, said brake actuating means comprising an electro-magnetic fluid valve, a switch on the panel in electric circuit with the electro-magnet of the valve and the feed wire, a spring actuated normally closed foot operated switch mounted on the platform and adapted to be held open by a rider-operator thereon, said foot operated switch being in parallel with the electro-magnet controlling switch, and foot pedal controlled means for operating the clutch actuating means, the pedal for said foot pedal controlled means being mounted on the platform.

3. The new combination according to claim 2, with a gear shift lever operator, means coupling the latter with the gear shift lever of the motor vehicle, and means for actuating said shift lever operator including a manually actuated control element adjacent to the control panel.

4. The new combination according to claim 2, with an electric switch mounted upon the rear of the body structure and electrically connected on one side with the pole side of the single-pole double-throw switch and electrically connected on its other side with the electromagnet of said fluid valve whereby closing of the last switch will effect operation of the fluid brakes in any position of said switch pole and an actuator for the switch mounted on the rear of the body structure for closing the latter switch when compressed between the body structure and another body.

5. The new combination according to claim 2, with a gear shift lever operator comprising a cylinder having a piston therein, a coupling between the piston and the lever, operating fluid conduits connected with the cylinder on opposite sides of the piston, and valve control means adjacent to said panel for directing an operating fluid selectively through the conduits to actuate the piston and the shift lever.

6. The new combination according to claim 2, with a power take-off mechanism shifting means including an actuating diaphragm encasing chamber, a compressed air conduit connected with the chamber on one side of the diaphragm, a valve in the conduit for controlling air flow into and from the chamber, electromagnet means which when energized opens said valve, a first power take-off control switch on said panel connected on one side to said feeder wire, a relay including a magnetic coil and a pair of normally open points and having the coil connected with the other side of said first switch and having the normally open points in series connection with the said electromagnetic means and said source of electric power, and a second switch located for operation from said driver station and in series connection with said electromagnetic means and said source of electric power.

7. As a new combination, a motor vehicle embodying a conventional driver station having a back part, conventional control for steering means, acceleration means, fluid brakes and means for actuating the latter; a body structure at the rear of the back part of the driver station, a rider-operator platform supported adjacent to the said back part of the driver station at an elevation relative thereto to permit a rider operator to step off therefrom to the ground and back thereon, a hand-hold fixed to the body structure adjacent to said back part of the driver station, a control panel fixed to the back of the said back part of the driver station, said control panel carrying a plurality of manually actuatable control units, an auxiliary operator respectively for the steering means, the acceleration means and the brake actuating means, the auxiliary operators for the steering means and the acceleration means being electrical and the control units therefor being an electric switch controlling an electric circuit having a respective one of the last named auxiliary operators therein, the auxiliary operator for the brake operating means comprising an electro-magnetically actuated fluid flow controlling valve, the manually actuatable control unit for the electro-magnetically controlled valve being an electric switch controlling an electric circuit having the electromagnet of the fluid flow control valve therein, a foot pedal actuated switch carried by the platform and electrically connected in parallel with the last named switch, and spring means normally urging the foot pedal actuated switch to closed position.

References Cited in the file of this patent

UNITED STATES PATENTS

| | | |
|---|---|---|
| 1,664,787 | Oakley | Apr. 3, 1928 |
| 1,748,041 | Backhus | Feb. 18, 1930 |
| 1,831,405 | Bacon | Nov. 10, 1931 |
| 1,887,572 | Winter | Nov. 15, 1932 |
| 1,909,377 | Neveu | May 16, 1933 |
| 1,911,872 | Bacon | May 30, 1933 |
| 1,942,181 | Maurer et al. | Jan. 2, 1934 |
| 2,588,815 | Fasolino | Mar. 11, 1952 |
| 2,638,232 | Perkins | May 12, 1953 |
| 2,674,333 | Zeilman et al. | Apr. 6, 1954 |
| 2,720,275 | Thayer | Oct. 11, 1955 |
| 2,761,569 | Iserman | Sept. 4, 1956 |
| 2,796,997 | Iserman | June 25, 1957 |